United States Patent
Kothrade et al.

(10) Patent No.: US 6,939,912 B2
(45) Date of Patent: Sep. 6, 2005

(54) COMPOSITIONS COMPRISING COPOLYMERS OF N-VINYLCARBOXAMIDES AND MONOMERS WITH A HYDROPHOBIC RADICAL, AND USE OF THESE COPOLYMERS

(75) Inventors: Stephan Kothrade, Limburgerhof (DE); Anton Negele, Deidesheim (DE); Helmut Meffert, Mannheim (DE); Axel Sanner, Frankenthal (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 43 days.

(21) Appl. No.: 10/150,109

(22) Filed: May 20, 2002

(65) Prior Publication Data

US 2003/0013800 A1 Jan. 16, 2003

Related U.S. Application Data

(62) Division of application No. 09/283,202, filed on Apr. 1, 1999, now abandoned.

(30) Foreign Application Priority Data

Apr. 3, 1998 (DE) .......................................... 198 15 127

(51) Int. Cl.⁷ ................................................ C08K 39/00
(52) U.S. Cl. ................ 524/555; 526/307.2; 526/307.4; 526/307.7
(58) Field of Search ....................... 524/555; 526/307.2, 526/307.4, 307.7

(56) References Cited

U.S. PATENT DOCUMENTS 6,426,383 B1 * 7/2002 Fong et al. .................. 524/827

* cited by examiner

Primary Examiner—Peter D. Mulcahy
(74) Attorney, Agent, or Firm—Novah Druce & Quigg

(57) ABSTRACT

Compositions comprising at least one water-insoluble ingredient and at least one copolymer of
A) from 5 to 99% by weight of at least one N-vinylcarboxamide of the formula I

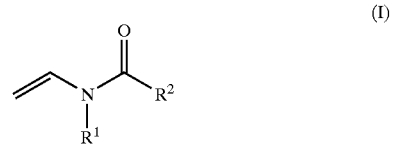

(I)

where $R^1$ and $R^2$ independently of one another are hydrogen or $C_1$–$C_6$-alkyl;
B) from 1 to 95% by weight of at least one monomer having a hydrophobic radical which can be copolymerized with vinylcarboxamides of the formula I; and optionally
C) from 0 to 94% by weight of at least one other copolymerizable monomer,
and the use of the above copolymers as solubility promoters.

11 Claims, No Drawings

COMPOSITIONS COMPRISING COPOLYMERS OF N-VINYLCARBOXAMIDES AND MONOMERS WITH A HYDROPHOBIC RADICAL, AND USE OF THESE COPOLYMERS

This is a division of application Ser. No. 09/283,202, filed Apr. 1, 1999 now abandoned, which application claims the benefit of German Patent Application No. 198 15 127.6, filed Apr. 3, 1998.

The present invention relates to compositions comprising at least one water-insoluble ingredient and at least one copolymer of at least one N-vinylcarboxamide, at least one monomer having a hydrophobic radical and optionally at least one copolymerizable monomer. It also relates to the use of these copolymers as solubility promoters and as protective colloid, in particular for the stabilization of oil-in-water emulsions.

Homo- and copolymers containing N-vinylcarboxamides have achieved a significant importance in the production of paper, paperboard and cardboard. U.S. Pat. No. 4,421,602 and EP 0 071 050 disclose hydrolyzed homopolymers of N-vinylformamide which comprise from 90 to 10 mol % of vinylamine units and from 10 to 90 mol % of N-vinylformamide units. The hydrolyzed polyvinylformamides are used as retention and drainage aids in papermaking. Building on this, EP 0 438 755 describes hydrolyzed homopolymers of N-vinylformamide which comprise less than 10 mol % of vinylamine units and are used as drainage, retention and flocculating aids for producing paper from paper stocks which contain contraries.

For enhancing the strength of paper, U.S. Pat. No. 3,207,656 describes the use of water-soluble copolymers based on cationic sulfonium ion-containing esters of acrylic acid or methacrylic acid. $C_1$–$C_{10}$-Alkyl esters of acrylic acid and methacrylic acid, $C_1$–$C_4$-alkylvinyl esters or N-vinylcarboxamides can be co-used to construct corresponding copolymers.

EP 0 251 182 discloses copolymers which, in addition to N-vinylformamide and N-vinylamine, also contain acrylonitrile units and, optionally, small amounts of acrylamide and acrylic acid units. These copolymers too are used in the paper industry.

For use as wet and dry strength enhancing agents for paper, EP 0 216 387 describes copolymers which, in addition to N-vinylformamide may also contain other ethylenically unsaturated monomers, such as vinyl acetate, vinyl propionate, $C_1$–$C_4$-alkyl vinyl ethers, N-vinylpyrrolidone, acrylamide or $C_1$–$C_{18}$-alkyl esters of acrylic and methacrylic acid. Partial or complete hydrolysis of these copolymers likewise gives copolymers containing vinylamine units.

DE 36 20 065 also discloses polymers for the production of paper, paperboard and cardboard, which are based on N-vinylcarboxamides or cyclic N-vinylamides, such as N-vinyllactams. These polymers, which can be used as drainage, retention and flocculating aids, can also comprise (meth)acrylamide, (meth)acrylonitrile, $C_1$–$C_{18}$-alkyl esters of acrylic and methacrylic acid, $C_1$–$C_4$-alkylvinyl esters or $C_1$–$C_4$-alkyl vinyl ethers.

The preparation of other copolymers of N-vinylcarboxamides which can be used for papermaking is described in EP 0 337 310 and EP 0 528 409. Water-soluble copolymers of N-vinylcarboxamides and acrylates, acrylamide, acrylic acid or acrylamide derivatives are prepared in JP-A-84/033312.

The use of N-vinylcarboxamides is also known in technical fields other than in papermaking.

For example, WO 82/02073 describes copolymers which, in addition to N-vinylformamides, can comprise further comonomers, such as acrylamide, (meth)acrylonitrile, (meth)acrylic acid or $C_1$–$C_6$-alkyl esters of acrylic or methacrylic acid. Such copolymers are used as friction-reducing agents for acids in the recovery of oil and natural gas.

JP-A-84/039399 describes hydrolyzed N-vinylcarboxamide-containing copolymers for the removal of water from slurries.

A cationic polymerization process for the synthesis of oligomers or polymers containing N-vinylformamide or N-vinylacetamide is known from DE 43 22 854. Possible comonomers are vinyl ethers, in particular butyl vinyl ether, styrene, α-methylstyrene, isobutylene and alkyl-substituted olefins. These polymers are intended to be used in hydrolyzed, partially hydrolyzed or nonhydrolyzed form in adhesives, binding agents, in water treatment, papermaking, oil and mineral recovery, bodycare and biomedicine.

Polymers which can be used in cleaning processes are described in EP 0 753 570. As well as N-vinylcarboxamides, these polymers can optionally comprise other comonomers, such as $C_1$–$C_{18}$-alkylvinyl esters, $C_1$–$C_4$-alkyl esters of acrylic or methacrylic acid, or acrylamide or methacrylamide optionally substituted by $C_1$–$C_{10}$ radicals. The use of these polymers is intended to prevent the redeposition of soiling following cleaning and to impart a certain resistance to soiling to the cleaned object.

WO 96/03969 and U.S. Pat. No. 5,478,533 describe haircare compositions comprising an N-vinylformamide homopolymer or a copolymer of N-vinylformamide units and another vinyl monomer selected from styrenes, $C_1$–$C_{18}$-alkyl esters of acrylic- and methacrylic acid, $C_1$–$C_{18}$-alkylvinyl esters, N—$C_1$–$C_{12}$—N'–$C_1$–$C_{18}$-alkyl-substituted acrylamides and methacrylamides, esters of fumaric, itaconic and maleic acid, vinyl ethers, such as methyl vinyl ether or isobutyl vinyl ether, hydroxy-functionalized acrylates and methacrylates, acrylamide, cyclic amides and other monomers. Such polymers are intended to give the haircare compositions hair-strengthening and hair-conditioning properties.

Finally, DE-A 25 14 100 describes copolymers of N-vinylpyrrolidone and $C_6$–$C_{24}$-alkyl (meth)acrylates and also terpolymers of N-vinylpyrrolidone, vinyl acetate and $C_6$–$C_{24}$-alkyl (meth)acrylates for use as emulsifiers for emulsions of the water-in-oil type, for example creams.

Many active ingredients and auxiliaries which are used as ingredients in pharmaceutical or cosmetic compositions and compositions for crop treatment or for nutrition technology are insufficiently soluble in water. This frequently results in disadvantages, for example formulations which are homogeneous and of satisfactory appearance are not obtained, or the desired effect is impaired, e.g. as a result of low bioavailability of an active ingredient. One way of diminishing such disadvantages is to solubilize the ingredients which are insoluble or sparingly soluble using solubility promoters, as a rule amphiphilic auxiliaries, e.g. surfactants. In this way, it is also possible to improve the bioavailability and effectiveness of an active ingredient.

It is an object of the present invention to provide compositions which permit better solubilization of water-insoluble ingredients.

We have found that this object is achieved, surprisingly, by a composition comprising at least one water-insoluble ingredient and at least one copolymer of A) from 5 to 99% by weight of at least one N-vinylcarboxamide of the formula I

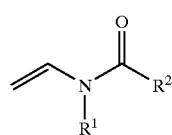

where $R^1$ and $R^2$ independently of one another are hydrogen or $C_1$–$C_6$-alkyl, preferably $C_1$–$C_3$-alkyl;

B) from 1 to 95% by weight of at least one monomer having a hydrophobic radical which can be copolymerized with vinylcarboxamides of the formula I; and optionally from 0 to 94% by weight of at least one other copolymerizable monomer.

Providing no other details are given, the following definitions apply in the case of the specific description of the invention:

The term "alkyl" includes straight-chain or branched alkyl groups, such as methyl, ethyl, propyl, isopropyl, n-butyl, isobutyl, t-butyl, n-pentyl, neopentyl, n-hexyl, n-heptyl, n-octyl, 2-ethylhexyl, n-nonyl, n-decyl, n-undecyl, lauryl, myristyl, cetyl, stearyl, arachinyl, behenyl or lignoceryl.

The term "alkenyl" includes straight-chain or branched, mono- or polyunsaturated alkenyl groups, such as palmitoleyl, oleyl, linoleyl, linolenyl or arachidonyl.

The term "cycloalkyl" includes cycloalkyl radicals, for example cyclopropyl, cyclobutyl, cyclopentyl, cyclohexyl, cycloheptyl or cyclooctyl.

The term "monoethylenically unsaturated $C_3$–$C_8$-carboxylic acid" includes mono- and dicarboxylic acids. These include, for example, acrylic acid, methacrylic acid, dimethacrylic acid, ethacrylic acid, maleic acid, citraconic acid, methylenemalonic acid, allylacetic acid, vinylacetic acid, crotonic acid, fumaric acid, mesaconic acid or itaconic acid. Of these, (meth)acrylic acid or maleic acid are preferred. "(Meth)acryl" is used as shorthand for "methacryl" and "acryl".

The term "monoethylenically unsaturated $C_3$–$C_8$-carboxylic acid" also includes free and partially or completely neutralized acids and anhydrides. In this connection, neutralized acids are taken to mean salts obtained by reaction of the acids with bases. For this purpose, alkali metal or alkaline earth metal bases, for example sodium hydroxide solution, potassium hydroxide solution, sodium or potassium carbonate, sodium or potassium hydrogencarbonate, magnesium oxide, calcium hydroxide, calcium oxide, gaseous or aqueous ammonia, or amines, for example triethylamine, ethanolamine, diethanolamine, triethanolamine, morpholine, diethylenetriamine or tetraethylenepentamine, are preferred.

The esters and amides of monoethylenically unsaturated dicarboxylic acids also include the monoesters or monoamides.

The term "aliphatic radical" includes hydrocarbon radicals which are straight-chain or branched, saturated or mono- or polyunsaturated, and/or are interrupted one or more times by groups chosen independently from O, S, CO or $SO_2$. The same also applies to cycloaliphatic radicals which additionally have at least one cyclic structural unit.

To construct the novel copolymers, the monomers A) used are N-vinylcarboxamides of the formula I in an amount of from 5 to 99% by weight, preferably from 10 to 90% by weight and in particular from 15 to 60% by weight.

The N-vinylcarboxamide of the formula I is preferably chosen from N-vinyformamide, N-vinyl-N-methylformamide, N-vinyl-N-ethylformamide, N-vinyl-N-propylformamide, N-vinyl-N-isopropylformamide, N-vinyl-N-n-butylformamide, N-vinyl-N-isobutylformamide, N-vinyl-N-t-butylformamide, N-vinyl-N-n-pentylformamide, N-vinyl-N-n-hexylformamide, N-vinylacetamide, N-vinyl-N-methylacetamide, N-vinyl-N-ethylacetamide, N-vinylpropionamide, N-vinyl-N-methylpropionamide and N-vinylbutyramide. Particular preference is given to N-vinylformamide and N-vinyl-N-methylacetamide.

It is of course also possible to use mixtures of the abovementioned N-vinylcarboxamides.

Additionally used to construct the novel copolymers are monomers B) having a hydrophobic radical, which are copolymerizable with vinylcarboxamides of the formula I, in amounts of from 1 to 94% by weight, preferably from 3 to 50% by weight and in particular from 5 to 40% by weight.

The monomers B) are usually long-chain, aliphatic or cycloaliphatic radicals having at least 8, preferably up to 30 and in particular having from 12 to 24 carbon atoms.

Of the above aliphatic radicals, preference is given to alkyl or alkenyl radicals, in particular n-octyl, 2-ethylhexyl, n-nonyl, n-decyl, lauryl, myristyl, cetyl, stearyl, behenyl or oleyl.

The cycloaliphatic radicals are preferably $C_5$–$C_8$-cycloalkyl radicals, in particular cyclohexyl or cycloheptyl which are substituted by $C_1$–$C_4$-alkyl. Very particular preference is given to t-butylcyclohexyl.

Esters of monoethylenically unsaturated $C_3$–$C_8$-carboxylic acids with aliphatic or cycloaliphatic $C_8$–$C_{30}$-alcohols, preferably $C_{12}$–$C_{24}$-alcohols, belong to preferred monomers having a hydrophobic radical, the aliphatic or cycloaliphatic alcohols being derived from the corresponding aliphatic or cycloaliphatic radicals defined above. They are preferably the primary monoalcohols of such radicals.

Amides of monoethylenically unsaturated $C_3$–$C_8$-carboxylic acids with primary or secondary amines containing at least one of the abovedefined aliphatic or cycloaliphatic $C_8$–$C_{30}$-radicals, preferably $C_8$–$C_{18}$-radicals are also preferred monomers having a hydrophobic radical. Primary amines lead to N-monosubstituted amides, while secondary amines lead to N,N'-disubstituted amides. The secondary amines can have two, possibly different, aliphatic or cycloaliphatic $C_8$–$C_{30}$-radicals, preferably $C_8$–$C_{18}$-radicals, or only one of these radicals together with an aliphatic or cycloaliphatic radical having from 1 to 7 carbon atoms, which is preferably one of the abovedefined $C_1$–$C_7$-alkyl radicals.

According to a preferred embodiment of the present invention, the abovedescribed esters and amides of monoethylenically unsaturated $C_3$–$C_8$-carboxylic acids are chosen from compounds of the formula II

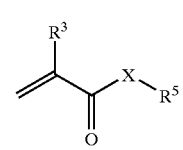

where $R^3$ is a hydrogen atom or a methyl group,
X is O or $NR^4$,
$R^4$ is H or $C_1$–$C_{30}$-alkyl, and
$R^5$ is $C_8$–$C_{30}$-alkyl, $C_8$–$C_{30}$-cycloalkyl or $C_8$–$C_{30}$-alkenyl.

Examples of suitable monomers B) that are copolymerizable with vinylcarboxamides of the formula I are the (meth)acrylate esters octyl (meth)acrylate, 2-ethylhexyl (meth)acrylate, nonyl (meth)acrylate, decyl (meth)acrylate, lauryl (meth)acrylate, myristyl (meth)acrylate, cetyl (meth)acrylate, stearyl (meth)acrylate, oleyl (meth)acrylate, behenyl (meth)acrylate and t-butylcyclohexyl (meth)acrylate, and the (meth)acrylamides N-stearyl(meth)acrylamide, N-octyl(meth)acrylamide, N,N-dioctyl(meth)acrylamide, N-cetyl(meth)acrylamide, N-dodecyl(meth)acrylamide, N-myristyl(meth)acrylamide and 2-ethylhexyl(meth) acrylamide.

Vinyl esters of aliphatic or cycloaliphatic $C_8$–$C_{30}$-carboxylic acids, preferably $C_8$–$C_{18}$-carboxylic acids, are also preferred monomers having a hydrophobic radical. The aliphatic or cycloaliphatic carboxylic acids are derived from the corresponding abovedefined aliphatic or cycloaliphatic radicals, preference being given to monocarboxylic acids.

Examples of suitable monomers B) that are copolymerizable with N-vinylcarboxamides of the formula I are accordingly also the vinyl esters of octanoic acid, nonanoic acid, decanoic acid, undecanoic acid, lauric acid, tridecanoic acid, myristic acid, palmitic acid, stearic acid, arachidic acid, or behenic acid or of oleic acid.

In addition, vinyl ethers of aliphatic or cycloaliphatic $C_8$–$C_{30}$-alcohols, preferably $C_8$–$C_{18}$-alcohols, are preferred monomers having a hydrophobic radical. The aliphatic or cycloaliphatic alcohols are derived from the corresponding abovedefined aliphatic or cycloaliphatic radicals, preference being given to monoalcohols.

Examples of suitable monomers B) that are copolymerizable with N-vinylcarboxamides of the formula I are accordingly also the vinyl ethers of octyl alcohol, 2-ethylhexyl alcohol, 1-nonyl alcohol, decyl alcohol, undecyl alcohol, lauryl alcohol, tridecyl alcohol, myristyl alcohol, palmityl alcohol, stearyl alcohol, arachidyl alcohol or behenyl alcohol or of oleyl alcohol.

Additionally used for constructing the novel copolymers are other monomers C) that are copolymerizable with N-vinylcarboxamides of the formula I in amounts of from 0 to 94% by weight, preferably from 0 to 50% by weight and in particular from 0 to 20% by weight.

In particular, the monomers are the following:

c1) The above-defined monoethylenically unsaturated $C_3$–$C_8$-carboxylic acids;

c2) esters of monoethylenically unsaturated $C_3$–$C_8$-carboxylic acids with aliphatic or cycloaliphatic $C_1$–$C_7$-alcohols, $C_1$–$C_4$-diols, mono- or di-$C_1$–$C_4$-alkylamino-$C_1$–$C_4$-alcohols. The aliphatic or abovedefined alkyl radicals, preference being given to primary monoalcohols. The $C_1$–$C_4$-diols also preferably have at least one primary hydroxyl group, such as ethane-1,2-diol, propane-1,3-diol, butane-1,3-diol or 2-methylpropane-1,3-diol. The amino groups of the mono- or di-$C_1$–$C_4$-alkylamino-$C_1$–$C_4$-alcohols are mono- or disubstituted by groups chosen independently of one another from hydrogen and $C_1$–$C_4$-alkyl radicals;

these monomers c2) include, for example, methyl (meth)acrylate, ethyl (meth)acrylate, hydroxyethyl (meth)acrylate, hydroxypropyl (meth)acrylate, hydroxybutyl (meth)acrylate, hydroxyisobutyl (meth)acrylate, monomethyl maleate, dimethyl maleate, monoethyl maleate, diethyl maleate, dimethylaminoethyl (meth)acrylate, diethylaminoethyl (meth)acrylate, t-butylaminoethyl (meth)acrylate or dimethylaminopropyl (meth)acrylate;

c3) amides of monoethylenically unsaturated $C_3$–$C_8$-carboxylic acids and mono- or di-$C_1$–$C_7$-alkylamides, preferably mono- or di-$C_1$–$C_4$-alkylamides, of monoethylenically unsaturated $C_3$–$C_8$-carboxylic acids. The mono- or dialkylamides are N-mono- or N,N-disubstituted amides of monoethylenically unsaturated $C_3$–$C_8$-carboxylic acids which are mono- or disubstituted by groups chosen independently from hydrogen and the abovedefined alkyl radicals;

these monomers c3) include, for example, (meth)acrylamide, N,N-dimethyl(meth)acrylamide or N-t-butyl (meth)acrylamide;

c4) nitriles of monoethylenically unsaturated $C_3$–$C_8$-carboxylic acids, for example (meth)acrylonitrile;

c5) N-vinyllactams and N-vinylimidazoles, for example N-vinylpyrrolidone, N-vinylcaprolactam, N-vinylimidazole, N-vinyl-2-methylimidazole or N-vinyl-4-methylimidazole;

c6) monoethylenically unsaturated compounds containing sulfonic acid groups, for example vinylsulfonic acid, allylsulfonic acid, methallylsulfonic acid, styrenesulfonic acid, 3-sulfopropyl (meth)acrylate or acrylamidoethylpropanesulfonic acid;

c7) monoethylenically unsaturated compounds containing phosphonic acid groups, for example vinylphosphonic acid, allylphosphonic acid or acrylamidomethylpropanephosphonic acid;

c8) vinyl esters of aliphatic or cycloaliphatic $C_1$–$C_7$-carboxylic acids. The cycloaliphatic $C_1$–$C_7$-carboxylic acids are derived from the corresponding abovedefined alkyl radicals, preference being given to monocarboxylic acids. Examples which can be mentioned are vinyl acetate and vinyl propionate;

c9) vinyl ethers of aliphatic or cycloaliphatic $C_1$–$C_7$-alcohols, preferably $C_1$–$C_4$-alcohols, the aliphatic or cycloaliphatic alcohols being derived from the above-described alkyl radicals. Preference is given to primary monoalcohols;

the monomers c9) include, for example, methyl vinyl ether, ethyl vinyl ether, propyl vinyl ether, isopropyl vinyl ether, n-butyl vinyl ether or isobutyl vinyl ether;

c10) vinyl aromatic compounds, for example styrene and substituted styrenes, such as β-methylstyrene and α-methylstyrene;

c11) acrylamidoglycolic acid or diallylammonium chloride.

It is of course also possible to use mixtures of the abovementioned copolymerizable monomers C).

Acrylic acid, methacrylic acid, maleic acid, N-vinylpyrrolidone and N-vinylcaprolactam are very particularly preferred from the abovedescribed copolymerizable monomers C).

An advantageous embodiment of the present invention is a composition comprising a copolymer of A) vinylformamide and/or N-vinyl-N-methylacetamide;

B) at least one (meth)acrylic ester of the abovedescribed fatty alcohols having from 12 to 24 carbon atoms and/or vinyl esters of the abovedescribed fatty acids having from 8 to 18 carbon atoms; and C) optionally acrylic acid, methacrylic acid, maleic acid, vinylpyrrolidone or N-vinylcaprolactam.

The copolymers are prepared by known processes, for example solution, precipitation, suspension or reverse suspension polymerization, or emulsion or reverse emulsion polymerization using compounds which form free radicals under polymerization conditions.

Thus, EP 0 071 050, for example, discloses linear polymers which contain copolymerized vinylformamide units. These polymers are prepared by homopolymerization.

Copolymers of N-vinylcarboxamides and other monoethylenically unsaturated compounds, such as acrylic acid, acrylates, vinyl acetate, N-vinylpyrrolidone or acrylonitrile are also described in the literature. Also known are the modified polymers obtainable therefrom by action of acids or bases, in which the carboamide groups may be completely or partially eliminated from the copolymerized N-vinylcarboxamides, and in which the copolymerized comonomers are optionally hydrolyzed. By way of example, the following documents may be cited: EP 0 216 387, EP 0 251 182, EP 0 528 409, WO 82/02073, JP 84/033302, JP 84/039399, EP 0 337 310 and DE 43 22 854.

The polymerization temperatures are usually in the range from 30 to 200° C., preferably from 40 to 100° C. Suitable initiators are, for example, azo and peroxy compounds and the customary redox initiator systems, such as combinations of hydrogen peroxide and reducing compounds, for example sodium sulfite, sodium bisulfite, sodium formaldehyde sulfoxylate and hydrazine.

The copolymers have K values of at least 7, preferably from 10 to 30. The polymers can, however, have K values up to 300. The K values are determined in aqueous solution at 25° C. at concentrations which, depending on the K value range, are between 0.1% and 5%, in accordance with H. Fikentscher, Cellulose-Chemie, Vol. 13, (1932) 58–64 and 71 to 74.

For the purposes of the invention, water-insoluble ingredients are taken to mean substances which are immiscible with water in any ratio. Frequently, they do not dissolve in effective concentrations, i.e. concentrations required for effectiveness. These are predominantly substances whose solubility in water is less than 30% by weight and in particular less than 20% by weight at 25° C. The present invention has a particularly advantageous effect in the case of ingredients having solubilities in water of less than 5% by weight and in particular of less than 1% by weight.

The novel water-insoluble ingredients include active ingredients and auxiliaries for pharmaceutical and cosmetic use on humans and animals, for crop treatment or for nutrition technology.

Examples of water-insoluble pharmaceutical active ingredients are fat-soluble vitamins and provitamins, in particular vitamins of the E group, protease inhibitors, such as ritonavir, indinavir or saquinavir, amlodipine, astaxanthine, astemizole, beclomethasone, benzocaine, betamethasone, bromazepam, bromocriptine, budesonide, camphor, captopril, carbamazepine, carboplatin, chloramphenicol, chlorhexidine, cyclosporin, cisplatin, clarithromycin, clonazepam, clotrimazole, clozapine, codeine, desogestrel, dexamethasone, diazepam, digoxin, dihydrocodeine, dihydroergotamine, dihydroergotoxin, ephedrine, epinephrine, erythromycin, estradiol, ethinylestradiol, etoposide, Eucalyptus globulus, felodipine, fentanyl, fluconazole, fluorouracil, fluoxetine, flurbiprofen, furosemide, gentamicin, Gingko biloba, glibenclamide, griseofulvin, guaifenesin, haloperidol, hydrocodone, hydrocortisone, hydromorphone, ibuprofen, indomethacin, isotretinoin, itraconazole, ketotifen, ketoconazole, ketoprofen, ketorolac, levonorgestrel, lidocaine, lorazepam, methotrexate, methylprednisolone, miconazole, naproxen, neomycin, nicardipine, nicotine, nifedipine, nimodipine, nitrazepam, nitrendipine, nizatidine, norethisterone, norgestrel, nystatin, ofloxacin, ondansetron, paclitaxel, phenobarbital, phenytoin, piroxicam, polymyxin B, prazepam, prednisolone, prednisone, propafenone, reserpine, retinol, riboflavin, rifampicin, sulbactam, sulfamethoxazole, sulfasalazine, tamoxifen, tretinoin, triamcinolone acetonide, triamterene, trimethoprim, troxerutin, vitamin E, zidovudine.

Active ingredients and auxiliaries for cosmetic use refer in particular to skin care, hair cosmetics, nail care or oral hygiene. Examples which can be mentioned are perfume oils, ethereal oils, essences or oily bath preparations.

Examples of active ingredients for crop treatment are pesticides, herbicides, fungicides or insecticides, mainly for spraying or pouring mixtures such as strobilurins, vinclozoline or epiconazole.

The active ingredients and auxiliaries for nutrition technology include food supplements, for example for dietetic foodstuffs, food dyes, such as carotenoids, or animal feed additives for animal nutrition.

Accordingly, the novel compositions are primarily pharmaceutical and cosmetic formulations, formulations for crop treatment and for nutrition purposes. These are preferably liquid (also as a spray), solid or semisolid. With regard to liquid and, in particular, aqueous formulations, the invention offers particular advantages.

In the field of pharmaceutical formulations, examples which can be mentioned are solid medicament forms, such as powders, fine powders, granules, tablets, dragees, capsules, suppositories or vaginal medicament forms, semisolid medicament forms, such as ointments, creams, hydrogels, pastes or plasters, and liquid medicament forms, such as solutions, emulsions, in particular oil-in-water emulsions, suspensions, for example lotions, injection and infusion preparations, eye and ear drops.

The cosmetic compositions include, for example, skin care compositions, such as skin cleansers, for example soaps or bath preparations, skin care compositions, usually emulsions and, in particular, oil-in-water emulsions, decorative body care compositions for the face, eyes, lips and nails, personal hygiene and foot care compositions, light protection compositions, skin tanning compositions, depigmenting compositions, insect repellent compositions, deodorants, antiperspirants, depilatories and shaving compositions, fragrances, dental and oral hygiene compositions or hair treatment compositions, for example for washing, treating, shaping, setting, bleaching or coloring hair.

Compositions for crop treatment can, for example, be in the form of directly sprayable solutions, powders, suspensions, including high-concentration aqueous suspensions or dispersions, emulsions, pastes, dusting compositions, spreading compositions or granules for spraying, atomizing, dusting, spreading or pouring.

In addition to the copolymers and the water-insoluble ingredients, the novel compositions can comprise other customary auxiliaries in the amounts usual for this purpose. These include, for example, antioxidants, antiirritants, antistatics, bath preparations, chelating agents, disinfectants, dispersants, coating auxiliaries, emulsifiers, emulsion stabilizers, optionally ethoxylated and/or propoxylated fatty alcohols, fatty amines, fatty amine oxides, fatty acid alkylolamides, fatty acid esters, fatty acids, humectants, film formers, gel formers, odor-masking agents, taste correction agents, hair conditioners, hairspray raw materials, hair care agents, resins, skin oils, skin care agents, skin protection substances, hydrocolloids, preservatives, lipcare agents, solvents, solubility promoters, moisturizers, wetting agents, neutralizing agents, pearlizing agents, permeation accelerators, pigments, protein derivatives and/or protein hydrolyzates, powder bases, quaternary ammonium compounds, refatting and superfatting agents, ointment, cream or oil base substances, ointment bases, foam formers, promoters or improvers, foam stabilizers, antifoams, silicone derivatives, spraying auxiliaries, stabilizers, sterilizing agents, stick compositions, sweeteners, sweetening agents, suppository bases, suspension agents, tablet auxiliaries, such as binders, fillers, lubricants, disintegrants or coatings, clays, propellants, drying agents, opacifiers, thickeners, denaturants, waxes, wax raw materials, softeners, white oils, active ingredient carriers or auxiliaries for dental care compositions, such as cleaning substances and wax raw materials. An embodiment in this connection is based on expert knowledge, as given, for example, in Fiedler, H. P., Lexikon der Hilfsstoffe für Pharmazie, Kosmetik und angrenzende Gebiete [Lexikon of Auxiliaries for Pharmaceuticals, Cosmetics and Associated Fields], 4th edition, Aulendorf: ECV-Editio-Kantor-Verlag, 1996.

Based on the total weight of the composition, the novel compositions usually comprise from 0.05% by weight to 20% by weight, preferably from 0.1 to 10% by weight and particularly preferably from 0.5 to 5% by weight, of the novel copolymer, and from 0.1% by weight to 90% by weight, preferably from 0.1 to 60% by weight, of an insoluble ingredient.

The novel copolymers are suitable in an excellent manner as solubility promoters (solubilizers). Solubility promoters are taken to mean substances which, as a result of their presence, render other compounds which are virtually insoluble in a certain solvent soluble or dispersible, i.e. suspendable or emulsifiable, in said solvent. Accordingly, the novel copolymers are suitable as solubility promoters for water-insoluble ingredients, in particular for the abovementioned active ingredients or auxiliaries for pharmaceutical or cosmetic use, for crop treatment or for nutrition technology.

A further important viewpoint is the use to increase the bioavailability of active ingredients, in particular in the field of pharmaceuticals and cosmetics. For topical application, the novel copolymers are suitable as permeation accelerators, i.e. for overcoming permeation barriers more easily, such as skin and mucosa. Also, many of the above-mentioned compositions require stabilization of liqid/liquid and/or solid/liquid mixtures in which the respective phases are immiscible with one another or do not spontaneously form a homogeneous mixture. The novel copolymers are thus also used as stabilizers for dispersions, i.e. emulsions, in particular oil-in-water emulsions, or also suspensions. In this property, they are also frequently referred to as protective colloids.

The Examples below serve to illustrate the invention without limiting it.

EXAMPLE 1

1 g of a copolymer of 90% by weight of N-vinylformamide and 10% by weight of stearyl acrylate was dissolved in 100 ml of water. The K value was 17.5. Into 1 ml of this solution it was possible to solubilize 190 µg of diazepam.

EXAMPLE 2

1 g of a copolymer of 40% by weight of N-vinylformamide, 40% by weight of N-vinylcaprolactam and 20% by weight of cetyl methacrylate was dissolved in 100 ml of water. The K value of this solution was 20.5. Into 1 ml of this solution it was possible to solubilize 215 µg of diazepam.

EXAMPLE 3

1 g of a copolymer of 60% by weight of N-vinylpyrrolidone, 20% by weight of N-vinylformamide and 20% by weight of dodecyl methacrylate was dissolved in 100 ml of water. The K value of this solution was 15.7. Into 1 ml of this solution it was possible to dissolve 180 µg of diazepam.

EXAMPLE 4

1 g of a copolymer of 90% by weight of N-methyl-N-vinylacetamide and 10% by weight of vinyl stearate was dissolved in 100 ml of water. The K value of this solution was 23.4. Into 1 ml of this solution it was possible to dissolve 220 µg of diazepam.

We claim:

1. A method of solubilizing a water-insoluble ingredient of a composition which comprises adding to the composition an effective amount of at least one N-vinylcarboxamide copolymer, and wherein the composition comprises water and the water-insoluble ingredient;

the water-insoluble ingredient is an active ingredient or auxiliary for pharmaceutical or cosmetic use, for crop treatment or for nutrition technology, and the N-vinylcarboxamide copolymer is composed of
A) from 5 to 99% by weight of at least one N-vinylcarboxamide of the formula I

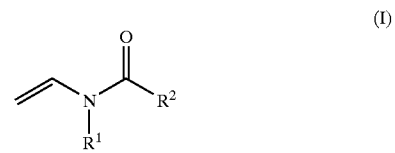

where $R^1$ and $R^2$ independently of one another are hydrogen or $C_1$–$C_6$-alkyl;

B) from 1 to 95% by weight of at least one monomer having a hydrophobic radical which can be copolymerized with vinylcarboxamides of the formula I and is selected from
b1) esters of monoethylenically unsaturated $C_3$–$C_8$-carboxylic acids with aliphatic or cycloaliphatic $C_8$–$C_{30}$-alcohols;
b2) amides of monoethylenically unsaturated $C_3$–$C_8$-carboxylic acids with primary or secondary amines having at least one aliphatic or cycloaliphatic $C_8$–$C_{30}$-radical;
b3) vinyl esters of aliphatic or cycloaliphatic $C_8$–$C_{30}$-carboxylic acids; or
b4) vinyl ethers of aliphatic or cycloaliphatic $C_8$–$C_{30}$-alcohols;
and
C) from 0 to 94% by weight of at least one other copolymerizable monomer.

2. A method as claimed in claim 1, wherein the N-vinylcarboxamide of the formula I is selected from the group consisting of N-vinylformamide and N-vinyl-N-methylacetamide.

3. A method of solubilizing a water-insoluble ingredient of a composition which comprises adding to the composition an effetive amount of at least one N-vinylcarboxamide copolymer, and wherein the composition comprises water and the water-insoluble ingredient;

the water-insoluble ingredient is an active ingredient or auxiliary for pharmaceutical or cosmetic use, for crop treatment or for nutrition technology, and the N-vinylcarboxamide copolymer is composed of A) from 5 to 99% by weight of at least one N-vinylcarboxaxnide of the formula I

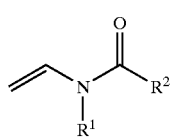

where $R^1$ and $R^2$ independently of one another are hydrogen or $C_1$–$C_6$-alkyl;

B) from 1 to 95% by weight of at least one monomer having a hydrophobic radical which can be copolymerized with vinylcarboxamides of the formula I, wherein the monomer having the hydrophobic radical is selected from
 b1) esters of monoethylenically unsaturated $C_3$–$C_8$-carboxylic acids with aliphatic or cycloaliphatic $C_{12}$–$C_{30}$-alcohols;
 b2) amides of monoethylenically unsaturated $C_3$–$C_8$-carboxylic acids with primary or secondary amines having at least one aliphatic or cycloaliphatic $C_{12}$–$C_{30}$-radical;
 b3) vinyl esters of aliphatic or cycloaliphatic $C_8$–$C_{30}$-carboxylic acids; or
 b4) vinyl ethers of aliphatic or cycloaliphatic $C_8$–$C_{30}$-alcohols;
 and C) from 0 to 94% by weight of at least one other copolymerizable monomer.

4. A method as claimed in claim 1, wherein the monomers b1) and b2) are chosen from compounds of the formula II

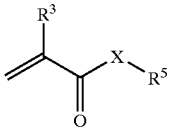

where $R^3$ is a hydrogen atom or a methyl group,
X is O or $NR^4$,
$R^4$ is H or $C_1$–$C_{30}$-alkyl, and
$R^5$ is $C_8$–$C_{30}$-alkyl, $C_8$–$C_{30}$-cycloalkyl or $C_8$–$C_{30}$-alkenyl.

5. A method as claimed in claim 1, wherein the other copolymerizable monomer is chosen from
 c1) monoethylenically unsaturated $C_3$–$C_8$-carboxylic acids;
 c2) esters of monoethylenically unsaturated $C_3$–$C_8$-carboxylic acids with aliphatic or cycloaliphatic $C_1$–$C_7$-alcohols, $C_1$–$C_4$-diols, mono- or di-$C_1$–$C_4$-alkylamino-$C_1$–$C_4$-alcohols;
 c3) amides of monoethylenically unsaturated $C_3$–$C_8$-carboxylic acids, mono- or di-$C_1$–$C_7$-alkylamides of monoethylenically unsaturated $C_3$–$C_8$-carboxylic acids;
 c4) nitriles of monoethylenically unsaturated $C_3$–$C_8$-carboxylic acids;
 c5) N-vinyllactams and N-vinylimidazoles;
 c6) monoethylenically unsaturated compounds containing sulfonic acid groups;
 c7) monoethylenically unsaturated compounds containing phosphonic acid groups;
 c8) vinyl esters of aliphatic or cycloaliphatic $C_1$–$C_7$-carboxylic acids;
 c9) vinyl ethers of aliphatic and cycloaliphatic $C_1$–$C_7$-alcohols;
 c10) vinylaromatic compounds;
 c11) acrylamidoglycolic acid or diallylammonium chloride.

6. A method as claimed in claim 5, wherein the other copolymerizable monomer is chosen from acrylic acid, methacrylic acid, maleic acid, N-vinylpyrrolidone and N-vinylcaprolactam.

7. A method as claimed in claim 1, comprising at least one copolymer of
 A) vinylformamide and/or N-vinyl-N-methylacetamide;
 B) at least one (meth)acrylic ester of fatty alcohols having from 12 to 24 carbon atoms and/or vinyl esters of fatty acids having from 8 to 18 carbon atoms; and
 C) optionally acrylic acid, methacrylic acid, maleic acid, vinylpyrrolidone or N-vinylcaprolactam.

8. A solubility promoter, comprising a copolymer of
 A) from 5 to 99% by weight of at least one N-vinylcarboxamide of the formula I

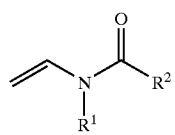

where $R^1$ and $R^2$ independently of one another are hydrogen or $C_1$–$C_6$-alkyl;

B) from 1 to 95% by weight of at least one monomer having a hydrophobic radical which can be copolymerized with vinylcarboxamides of the formula I and is selected from
 b1) esters of monoethylenically unsaturated $C_3$–$C_8$-carboxylic acids with aliphatic or cycloaliphatic $C_8$–$C_{30}$-alcohols;
 b2) amides of monoethylenically unsaturated $C_3$–$C_8$-carboxylic acids with primary or secondary amines having at least one aliphatic or cycloaliphatic $C_8$–$C_{30}$-radical;
 b3) vinyl esters of aliphatic or cycloaliphatic $C_8$–$C_{30}$-carboxylic acids; or
 b4) vinyl ethers of aliphatic or cycloaliphatic $C_8$–$C_{30}$-alcohols;
 and C) from 0 to 94% by weight of at least one other copolymerizable monomer.

9. A protective colloid, comprising a copolymer of
 A) from 5 to 99% by weight of at least one N-vinylcarboxamide of the formula I

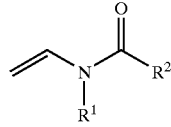

where $R^1$ and $R^2$ independently of one another are hydrogen or $C_1$–$C_6$-alkyl;

B) from 1 to 95% by weight of at least one monomer having a hydrophobic radical which can be copolymerized with vinylcarboxamides of the formula I and is selected from
- b1) esters of monoethylenically unsaturated $C_3$–$C_8$-carboxylic acids with aliphatic or cycloaliphatic $C_8$–$C_{30}$-alcohols;
- b2) amides of monoethylenically unsaturated $C_3$–$C_8$-carboxylic acids with primary or secondary amines having at least one aliphatic or cycloaliphatic $C_8$–$C_{30}$-radical;
- b3) vinyl esters of aliphatic or cycloaliphatic $C_8$–$C_{30}$-carboxylic acids; or
- b4) vinyl ethers of aliphatic or cycloaliphatic $C_8$–$C_{30}$-alcohols;

and

C) from 0 to 94% by weight of at least one other copolymerizable monomer.

10. The method of claim 1, for preparing a composition comprising water and, based on the weight of the composition, from 0.1 to 90% by weight of the water-insoluble ingredient, and from 0.05 to 20% by weight of the copolymer.

11. The method of claim 3, for preparing a composition comprising water and, based on the weight of the composition, from 0.1 to 90% by weight of the water-insoluble ingredient, and from 0.05 to 20% by weight of the copolymer.

* * * * *